United States Patent
Heim et al.

(10) Patent No.: US 10,362,655 B2
(45) Date of Patent: Jul. 23, 2019

(54) LIGHT EMITTING DIODE LIGHTING SYSTEM AND METHOD

(71) Applicant: Colorbeam NorthAmerica Inc., Montreal, Quebec (CA)

(72) Inventors: Alexandre Heim, Mezos (FR); Sebastien Licht, Montreal (CA); Maurizio Gaudio, Laval (CA); Michael Teolis, Ile Bizard (CA)

(73) Assignee: COLORBEAM NORTHAMERICA INC., Montreal (CA)

( * ) Notice: Subject to any disclaimer, the term of this patent is extended or adjusted under 35 U.S.C. 154(b) by 0 days.

(21) Appl. No.: 15/618,072

(22) Filed: Jun. 8, 2017

(65) Prior Publication Data

US 2017/0359878 A1    Dec. 14, 2017

(51) Int. Cl.
| | |
|---|---|
| *H05B 37/00* | (2006.01) |
| *H05B 33/08* | (2006.01) |
| *H04L 12/24* | (2006.01) |
| *H04L 29/08* | (2006.01) |
| *H04L 29/06* | (2006.01) |
| *H05B 37/02* | (2006.01) |

(52) U.S. Cl.
CPC ....... *H05B 33/0863* (2013.01); *H04L 41/082* (2013.01); *H04L 67/125* (2013.01); *H04L 69/164* (2013.01); *H05B 33/0845* (2013.01); *H05B 37/0254* (2013.01)

(58) Field of Classification Search
CPC .. G05B 15/02; G05B 19/0426; G05B 19/042; G05B 2219/25428; G05B 19/409; G05B 2219/40479; G05B 2219/45083; G05B 19/41825; G05B 2219/33125; G05B 2219/33337; E05F 15/0017; E05Y 2900/106; G06Q 10/06; A47J 37/1266; B25J 9/161; B25J 9/1664; B25J 9/1671; B25J 9/0084; G06F 3/0614; G06N 3/008; B62D 57/032; G05D 1/0274; G05D 1/0255; G05D 1/0246; G05D 1/0242
See application file for complete search history.

(56) References Cited

U.S. PATENT DOCUMENTS

| | | | | |
|---|---|---|---|---|
| 2005/0275626 A1* | 12/2005 | Mueller | ............. | H05B 37/0245 345/156 |
| 2010/0084992 A1* | 4/2010 | Valois | ................ | H05B 37/0254 315/291 |
| 2014/0070707 A1* | 3/2014 | Nagazoe | ............. | H04B 10/116 315/151 |

* cited by examiner

*Primary Examiner* — Minh D A
(74) *Attorney, Agent, or Firm* — Brouillette Legal Inc.; Robert Brouillette (57) ABSTRACT

A system and method for automating lighting fixtures is provided. The system comprises a gateway adapted to control lighting fixtures. The gateway allows creating, updating, storing and/or deleting lighting programs in real time. The gateway comprises a data source, a control manager and a Digital Multiplexing (DMX) runtime. The DMX runtime is configured to receive a request from the control manager, process the request and to generate signals on at least one DMX channel for control of DMX compatible lighting fixtures. The method comprises receiving request to modify at least one parameter of at least one of a plurality of lighting fixtures; processing the request; comparing the request with the data in a database; and generating each DMX signal over at least one channel at a DMX frequency.

19 Claims, 3 Drawing Sheets

LIGHT EMITTING DIODE LIGHTING SYSTEM AND METHOD

CROSS-REFERENCE TO RELATED APPLICATIONS

The present patent application claims the benefits of priority of the Canadian Patent Application No. 2,932,342, entitled "Programme d'eclairage LED", and filed at the Canadian Intellectual Property Office on Jun. 8, 2016, the content of which is incorporated herein by reference.

FIELD OF THE INVENTION

The present invention generally relates to the field of lighting programs and more specifically to lighting programs using light emitting diodes (LED).

BACKGROUND OF THE INVENTION

Lighting programs are well known in the art. Originally, such lighting programs were used to control lights and effects in shows or events. More recently, lighting programs have been developed for home usage and/or home automation.

The present system generally uses proprietary protocols to control the lighting systems. Over the time, standard protocols have been developed, such as DMX or Artnet. The current systems comprise external module converting a proprietary protocol to a DMX protocol. The external module typically interacts with a central controller over a network, such as Ethernet. Such configuration allows existing controller to communicate with lighting system using standard protocols but create performance issues as network may be get clogged or external module may not have enough processing speed to cope with the different signals.

Furthermore, in current systems, each light channel is individually controlled by the controller. Thus, if a specific green light with a specific intensity must be outputted, each light channel must be individually and manually configured to a specific value to obtain the desired effect. Such process is time consuming and may not provide exact results.

Moreover, to obtain the above discussed green light at a specific intensity, a configuration must be coded and compiled prior to testing the result. Again, such process is time consuming and may result in undesired effects.

Thus, there is a need for a lighting program system and method allowing the control of color LEDs in real time, such system and method aiming at overcoming the shortcomings of the prior art systems.

SUMMARY OF THE INVENTION

The shortcomings of the prior art are generally mitigated by a system and a method for controlling lighting fixtures as described herein.

In a first aspect, a system for controlling a plurality of lighting fixtures in real-time is provided. In at least one embodiment, the system may comprise at least one gateway connected to a network and a computerized device. In at least one embodiment, each gateway may comprise a data source configured to receive and store lighting programs; a control manager in communication with the data source, the control manager being configured to generate one or more request comprising instructions to control to at least one of the lighting fixtures and fetch lighting programs for the data source; a digital multiplexing (DMX) engine in communication with the control manager, the DMX engine being configured to process the one or more requests of the control manager; and generate in real time the required signals on at least one DMX channel for control of at least one of the plurality of lighting fixtures, the generated signals being calculated to control the lighting fixtures based on the instructions of the processed request. In at least one embodiment, the computerized device may be connected to the network and configured to communicate with the gateway to update the lighting programs.

In at least one embodiment, the system may further comprise at least one external control system, the external control system being configured to communicate with the at least one gateway; and send a request to the control manger comprising instructions for at least one of the plurality of lighting fixtures.

In at least one embodiment, the at least one instructions may be at least one of color, intensity of light, and duration.

In at least one embodiment, the control manager may be further configured to compare the instructions received from the external system with the lighting program stored in the data source and to send a request comprising the instructions of the external system when the instructions of the external system differs from the lighting program data.

In at least one embodiment, the gateway may further comprise a UDP control manager interface configured to send and received UDP request to the external system. The at least one of the plurality of lighting fixtures may be a light emitting diode (LED). The instructions of the request may be at least one of color, intensity of light, and duration.

In at least one embodiment, the gateway may further comprise a transient memory unit. The control manager may be further configured to load the lighting program data stored in the data source in the transient memory unit.

In at least one embodiment, the gateway may further comprise a websocket interface in communication with the control manager and may be configured to receive requests from the computerized device, the computerized device further comprising a websocket client interface.

In a second aspect, a gateway for controlling lighting fixtures is provided. In at least one embodiment, the gateway may comprise a data source configured to receive and store lighting programs for lighting fixtures; a control manager configured to synchronize with the data source and to generate a request comprising instructions for lighting fixtures; a digital multiplexing (DMX) engine in communication with the control manager. In at least one embodiment, the DMX engine may be configured to: process the one or more requests of the control manager; generate in real time the required signals on at least one DMX channel for control of at least one of the plurality of lighting fixtures, the generated signals being calculated to control the lighting fixtures based on the instructions of the processed request.

In at least one embodiment, the DMX engine may be configured to adjust RGB colors of DMX channels upon reception of the request from the control manager.

In at least one embodiment, the request may comprise at least one of the parameters selected in color to be displayed, intensity of light and duration.

In at least one embodiment, the DMX engine may further comprise at least one timer, each timer being configured to control frequency of output of the DMX signals over DMX channels.

In at least one embodiment, the frequency at which the request is sent to the DMX runtime from the control manager may be lower than the frequency of the signal output to the DMX channels by the DMX runtime.

In at least one embodiment, the frequency at which the request is sent to the DMX runtime from the control manager may be at least 10 times lower than the frequency of the signal output to the DMX channels by the DMX runtime.

In a third aspect, a method for controlling at least one lighting fixture in real time is provided. In at least one embodiment, the method may comprise fetching at the parameters of at least one lighting program from a data source; generating a request to a DMX engine, the request comprising at least the parameters of the lighting fixture based on the fetched parameters; and outputting in real time to the at least one DMX channel of the lighting fixture DMX signals required for the lighting fixture to display the parameters of the request.

In at least one embodiment, the at least one parameter may be at least one of color, intensity, and duration.

In at least one embodiment, the method may further comprise generating, in real-time, a new request to the DMX engine when the lighting program is updated in the data source.

In at least one embodiment, the method may further comprise: receiving a request comprising instructions for a lighting fixture from an external device system, signal from the third party; comparing the instructions of the received request with the lighting program in the data source; and generating, in real-time, a new request to the DMX engine when the instructions of the received request differ from the lighting program in the data source.

In at least one embodiment, the method may further comprise updating a lighting program stored in the data source using a computerized device; and creating a lighting program and storing the lighting program in the data source using the computerized device.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel system and method for controlling lighting programs will be described hereinafter. Although the invention is described in terms of specific illustrative embodiments, it is to be understood that the embodiments described herein are by way of example only and that the scope of the invention is not intended to be limited thereby.

The lighting system and method as described herein allow controlling and scheduling of light fixtures and systems, such as commercial and residential installations. The scheduling and/or control of the lighting fixtures are also referred as a lighting program. A lighting program is generally stored on a non-transient memory. The program comprises a description of the different fixtures, such as electric panels, LED drivers, light zones, such as room or floors and lighting circuits.

The type of the fixtures or lights ("loads") may be built-in fixtures, projectors, strips or other systems allowing multiple configurations, such as a plurality of Digital Multiplexing (DMX) channels. In at least one embodiment, the lights are LED lights and in a preferred embodiments, the LED lights are color LEDs.

A typical user of the system and method as described herein may be a technician and/or a home automation or smart home integrator. In a preferred embodiment, an end user (client) does preferably not have access to the module for programming and/or configuring the lighting fixtures. An end user is preferably provided with a simple, concise and functional user interface. As an example, the user may be trained as to how to use the system and method.

The system for automating lighting fixtures or systems provides an interface for creating, updating, storing and/or deleting lighting programs in real time. In a preferred embodiment, the system controls the DMX compatible fixtures at a frequency of 40 times per seconds on all DMX channels of each of the universe. The number of channel is preferably 512 channels.

Figure 1:
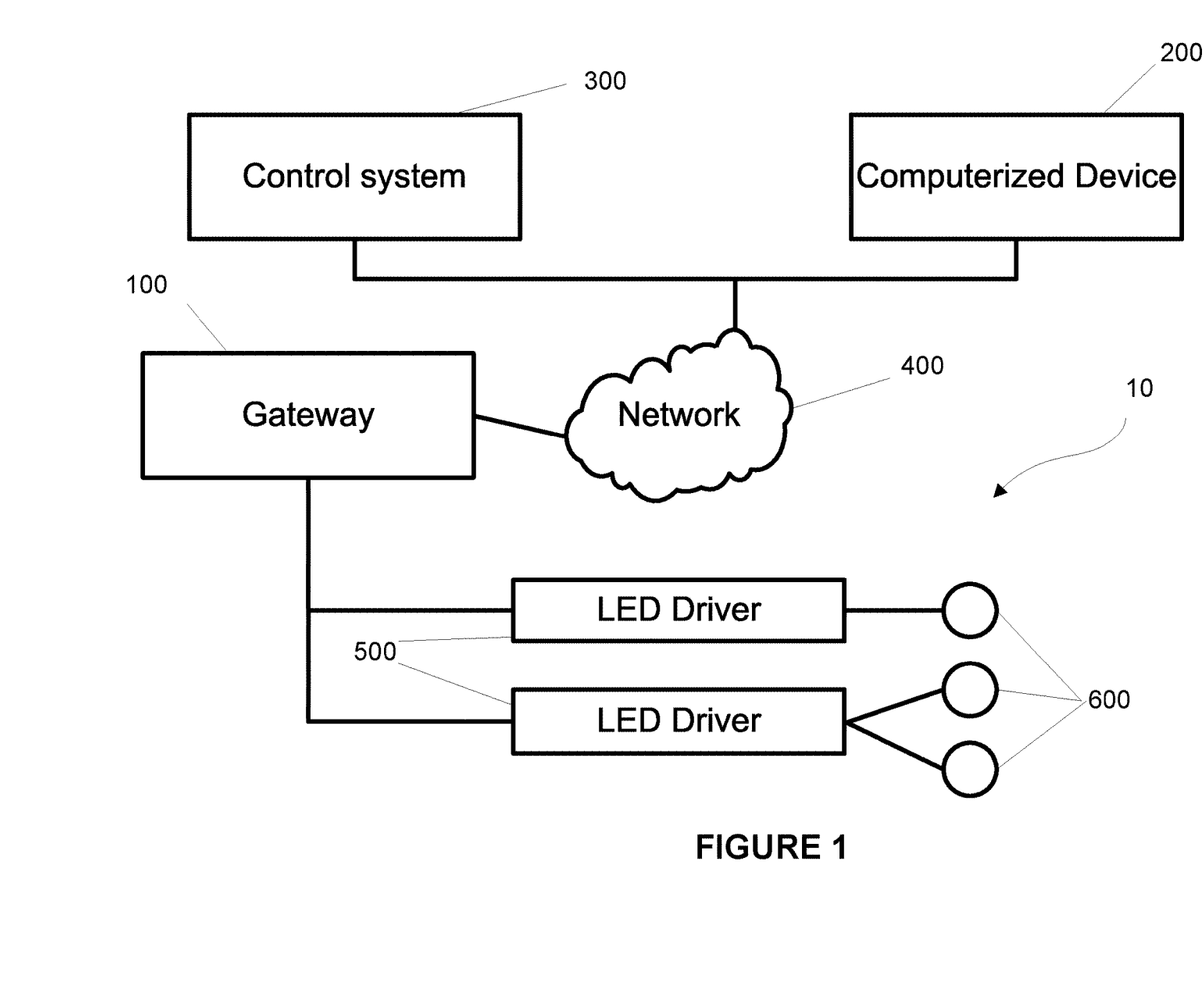
FIG. 1 is diagram showing a LED lighting system in accordance with the principles of the present invention.

Referring now to FIG. 1, a typical system for controlling and programming lighting systems 10 is shown. The system generally comprises a gateway 100 connected to a network 400, such as but not limited to Ethernet, Internet, LAN network or any network of computer devices. The system 10 further comprises a computerized device 200, such as a computer, a mobile device or any other type of computerized device. The computerized device 200 is connected to the network 400 and is configured to communicate with the gateway 100. The system may further comprise one or more external control systems 300 connected to the network 400 and configured to communicate with the gateway 100. The external control system 300 generally controls or communicates with third party fixtures or equipment. The system 10 further comprises LED driver adapted to control and communicate with LED lighting devices or fixtures 600. The gateway 100 is configured to communicate with the LED drivers 500 in order to control or communicate with the lighting fixtures 600.

Understandably, the LED drivers 500 may be unitary with the gateway 100 in order to improve performances.

In a preferred embodiment, the gateway 100 comprises a web server 114 or web socket module 112. The web server 114 is configured to provide a user interface to the computerized device 200. The web socket module 112 is configured to provide a communication link between the gateway 100 and the computerized device 200, such as web services, API and XML or HTTP-based protocols. The interfaces provided through the web socket 112 and web server 114 allow the configuration of lighting programs. Understandably, the present invention is not limited to web interfaces or API interfaces, any other method for providing a configuration to the gateway over a network or a communication link may be used without departing from the scope of the present invention, such as mobile application or client-server desktop application.

Figure 2:
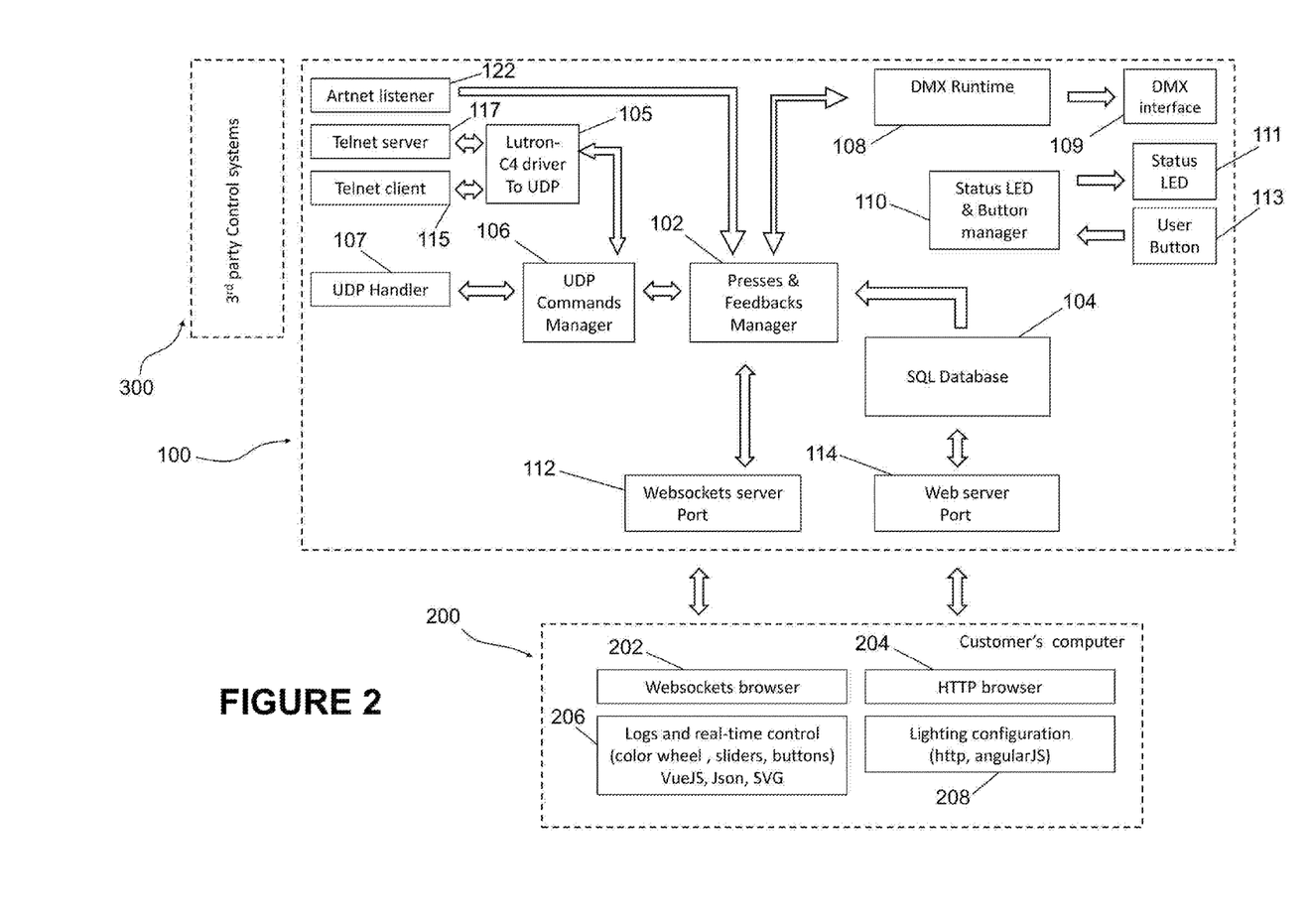
FIG. 2 is a component diagram of a gateway system for executing a LED lighting program in accordance with the principles of the present invention.

Now referring to FIG. 2, a preferred embodiment of the gateway 100 and of a computerized device 200 is shown. The gateway 100 generally comprises a central processing device (CPU), a storage unit, such as flash memory or hard drive, a transient memory unit and a network adapter (not showed). In a typical embodiment, the gateway is a server, a computer or any other type of computerized device such as a Raspberry PI™.

The gateway 100 further comprises control manager or module 102, a data source 104, such as a SQL database, text database or XML file and DMX runtime 108.

The data source 104 is configured to store the lighting programs. In a preferred embodiment, the data source 104 is a read/write relational database comprising tables for storing lighting program values. For example, the database 104 may comprise the following Tables 1-5. Such tables may comprise information about various lights to be used in various rooms or areas. Furthermore, the database comprises the associated channels with the different fixtures to be controlled.

TABLE 1

Loads.

| Id | name | Type | Room |
|----|------|------|------|
| 37 | Ceiling | 2 | 14 |
| 42 | counters | 3 | 14 |
| 68 | Bed right | 2 | 15 |

TABLE 2

Load types.

| Id | Name | channels | Notes |
|----|------|----------|-------|
| 2 | Pol50 | 5 | Need coupler |
| 3 | Strip RGB | 3 | need heatsink |

TABLE 3

Rooms.

| Id | name | Area |
|----|------|------|
| 14 | Kitchen | 1 |
| 15 | Mbed | 2 |

TABLE 4

Areas.

| id | name | Notes |
|----|------|-------|
| 1 | First floor | |
| 2 | Second floor | |

TABLE 5

Example of a screen table for configuration of Loads.

| Load name | Load type | location | channels | Area |
|-----------|-----------|----------|----------|------|
| Counters | Strip RGB | Kitchen | 3 | First floor |
| Bed right | Pol50 | Mbed | 5 | Second floor |

TABLE 6

(for load.id = 42 (counters), see Table 1)

| Loads.name | Load_types.name | Rooms.name | Loads_type.channels | Rooms.areas.name |
|------------|-----------------|------------|---------------------|------------------|
| Counters | 3<br>Loads[3].name = Strip RGB | 14<br>Rooms[14].name = Kitchen | 3<br>Loads[3].channels = 5 | 14<br>Rooms[14].area = 1<br>Areas[1].name = first floor |

The control manager 102 (also referred as the presses & feedbacks manager) is configured to load the lighting program data from the data source 104 into the transient memory of the gateway. The control manager 102 is further configured to synchronize with the data source 104 when such data source is updated or changed. As an example, the control manager 102 may read or may receive an indicator of a change to the data source 104, upon reception of the indicator; the control manager 102 reloads the lighting program data into the transient memory. In a preferred embodiment, the control manager 102 synchronizes with the database at a predetermined frequency allowing applying changes to the program in real time.

The lighting program data of the data source 104 may be updated from the computerized device 200 via the web socket 112 or the web server 114. In some other embodiment, the program data may be updated following data received from the external control systems 300.

The control manager 102 is further configured to use the lighting program configuration data to generate a signal or request comprising the instructions to be provided to the lighting fixtures. The said request is communicated to the DMX runtime 108. In a typical embodiment, the request may be sent by the control manager 102 to the DMX runtime 108 at a predetermined frequency, such as every second, minute, or hour or may be sent upon reception of an event or request.

The DMX Runtime 108 is processing each received request and generates the different signals on the DMX channels to be controlled accordingly.

In a preferred embodiment, the request comprises the color to be displayed, the intensity of the light and the duration. The DMX runtime 108 processes the request by calculating which DMX channels shall be activated and at which intensity to obtained the desired light color. The DMX runtime 108 thus generates each DMX signal over the required channels at the required DMX frequency (such as 40 times per seconds) and will maintain outputting the signal with the last known state.

In at least one embodiment, an adjustment of the RGB colors may be performed by the DMX runtime 108 upon reception of the request from the control manager 102.

As an example, the following command may be prepared by the control manager 102: U0-CH17-FF00FF-L50-T2000→UNIVERSE 0, CHANNEL 17. Such command requests a PINK COLOR (FF00FF), at an intensity level of 50% to be applied in 2000 milliseconds. Upon reception of the said command, the DMX runtime 108 applies internal timers to complete the request and output the signals to the DMX interface.

In some embodiments, the DMX Runtime 108 further comprises one or more timers (not shown). Each timer is configured to control the time at which the output of the DMX signals is sent over the required DMX channels.

In yet another embodiment, the gateway 100 may further comprise a DMX interface 109 configured to communicate with the lighting fixtures 600.

In a further embodiment, the gateway 100 may further comprise a hardware interface for the user, such as a status LED and button manager 110. The said status LED and button manager 110 is configured to control the turning on of status LED 111 and to received the input of a user controls, such as a user button 113. Understandably, any type of user interface could be used without departing from the scope of the present invention.

When the lighting program data is updated in the data source 104 or if any command or request is received from UDP command manager 106, the Artnet interface 122 or the websocket server 112, the control manager 102 sends another request to the DMX Runtime 108. Upon reception of the second request, the DMX runtime 108 calculate the new signals to be output to the DMX channels. The request may be a new request or, in some embodiments, a correction or updated request to override the initial request received by the DMX runtime 108 and may cancel the precedent request. Understandably, the frequency at which the request are sent to the DMX runtime 108 from the control manager 102 is generally much lower than the frequency of the signal output to the DMX channels by the DMX runtime 108.

In another embodiment, the system 10 may comprise a plurality of gateways 100 to increase the number of channels being controlled. In such configurations, the gateway 100 may be configured to act in master mode or in slave mode. The gateway being in master mode is configured to send the request to the other gateways 100 acting in slave mode. Upon reception of the request, the control manager 102 of the slave gateways 100 generates the requests to the DMX runtimes 108 to control the DMX channels. In such an embodiment, the lighting program data is always stored and updated in the master gateway 100.

The gateway 100 further comprises an interface with the computerized device 200 to update, create and/or edit the lighting program data in the data source 104. In a preferred embodiment, the interface is a websockets server port 112 and/or a web server port 114. The websockets server 112 generally provides an API or web services configured to exchanged data with a websockets browser 202. The web server 114 is configured to provide a web interface via a web browser 204 of the computerized device 200.

In some embodiments, the websockets server 112 may be a bidirectional WEB socket.

In an embodiment using a web server 114, a user interface may be available online. For example, an integrator (user) may define LED lighting over the web-site. The data collected at the integrator's computer 200 may be stored in the data source 104 via the web server 114. In a further embodiment, the computerized device 200 may be configured to directly access the data source 104 using a direct driver, such as ODBC driver or API.

In embodiments using websockets, the websocket server 112 is configured to receive information from the computer 200 from the websockets browser 202. Such information may contain, for example, real-time control and may be then transmitted to the control manager 102 which may then send a corresponding request to the DMX runtime 108.

In yet another embodiment, the gateway 100 may comprise other types of interfaces to natively connect with other input devices (such as RS485 port or USB port). For $3^{rd}$ party devices, similarly to the UDP manager 106, the gateway 100 would comprise a manager for converting native requests and to send the request to the control manager 102.

Still referring to FIG. 2, the computerized device 200 typically comprises a CPU, a storage unit, a volatile memory unit and a network adapter. Understandably, any device such as computer, a tablet, a smart phone or a mobile phone could be used. In a preferred embodiment, the computerized device 200 connects to the gateway via the websocket browser 202 or the HTTP browser 204. The computerized device 200 is preferably configured to store logs, real-time control information 206 and lighting configurations 208. The computerized device may be configured to display controls 206 for a user to control fixtures 600, such sliders, buttons, color wheel).

In some embodiments, the computerized device 200 is configured to display configuration interfaces of the gateway 100. The said interfaces are preferably used by a technician to configure the lighting programs and to associate the lighting scenes or zones with the corresponding DMX channels identifications. In a preferred embodiments, the changes to the lighting programs or the new configuration data is stored in the data source 102 via the webserver port 114 of the gateway 100. Other interfaces may provide a mean to directly send command to the fixtures through the Websockets server 112. Such commands are typically used to test a change to a program in real time or to override the value of the current lighting program.

In some other embodiments, the system may further comprise other computerized devices generally used by a home user. The user computerized device typically comprises a CPU, a storage unit, a volatile memory unit and a network adapter. Understandably, any device such as computer, a tablet, a smart phone or a mobile phone could be used. In a preferred embodiment, the computerized device 200 connects to the gateway via the websocket browser 202 or the HTTP browser 204. The user computerized device is typically used to provide a mean to directly send command to the fixtures through the Websockets server 112. Such commands are typically used to test a change to a program in real time or to override the value of the current lighting program.

Still referring to FIG. 2, in embodiment comprising one or more $3^{rd}$ party control system 300, the gateway 100 further comprise a UDP commands manager 106 to communicate with the external control system 300. In such an embodiment, the UDP command manager 106 to receive request from the control manager 102 and to generally UPD packet from such request. In a typical embodiment, the UDP commands manager 106 use a UDP handler 107 to communicate with the external control systems 300.

In other embodiment, a $3^{rd}$ party driver (such as C4 or Lutron™ drivers) 105 is used to convert UPD packets to a proprietary protocol, typically but not exclusively through a Telnet server 117 or Telnet client 115.

In yet other embodiment, the control manager 102 is connected to an Artnet listener or Artnet port 122 configured to communicate with external systems 300 through the Artnet protocol.

Thus, in a typical usage scenario, the control manager 102 send a request to the UPD commands manager 106 which generate the UDP packets compatible with the external control systems 300 or with the 3$^{rd}$ party drivers 105. The UDP commands manager 106 may be further configured to receive UPD packet from the 3$^{rd}$ party external system 300 or from the 3$^{rd}$ party driver 105 to generate a request to the control manager 102. The communication manager 102 may also receive information from Artnet listener 122.

For example, one or more programs may be executed on the processor using drivers 105. For example, such drivers may be of type of Creston™ and/or Lutron™.

The control manager 102 may then forward or generate a request to the DMX runtime 108 to control the lighting fixtures. Thus, the lighting fixtures could be controlled through a 3$^{rd}$ party control system 300 (such as a DJ Console supporting the Artnet protocol) through the gateway 100. In an embodiment where the 3$^{rd}$ party control system 300 controls the fixtures 600, a command is set through the 3$^{rd}$ party control system 300, such as via a slider or any type of control. In such an example, the command is received by the control manager 102 through the Artnet listener. The control manager 102 compares the received command with the information in the data source 104. If such information is different, the control manager 102 generate a request to the DMX runtime 108 to override the present lighting with the command received from the 3$^{rd}$ party control system 300.

If the information is different, the control manager 102 may further communicate a feedback comprising status of the lighting fixture to one or all the external device system 300. Upon reception of the feedback, the external device system 300 adjust or change the control to reflect the new values, parameters or status of the fixture 600. Such feedback creates a bidirectional protocol or bidirectional communication between the DMX controlled fixtures 600 and the external control systems 300. The gateway 100 generally manage and control the bidirectional communication by receiving the request from the external control systems 300 and creating the resulting DMX signals and by sending a feedback message through the UDP manager 106, the websocket server 112 and or the Artnet listener 122.

In other embodiments, the 3$^{rd}$ party control may comprise an interface or control allowing the command to be saved or stored in the data source 104 to change the lighting program.

Still referring to FIG. 2, the 3$^{rd}$ party control systems 300 may be embodied as one or more touch panels, one or more keypads and corresponding processors. For example, these keypads and touch panels may have protocols different from the protocol used by the communication manager 102. For example, the UDP commands manager 106 may be configured to receive data from UDP handler or other drivers (e.g. Lutron C4 diver to UDP) and convert such data to the unique protocol. The converted data may then be transmitted to the control manager 102.

In at least one embodiment, the installer may choose and/or adjust colors and scenes. The gateway 100 may be controlled by the 3$^{rd}$ party home automation system (e.g. Creston or Lutron) or by customer's computer 200 (e.g. Colorbeam).

Such communication may be done by call of the scenes and by feedbacks in binary or analog form. For example, with Colorbeam, Creston or Control4 it may be possible to adjust the light zones or to redefine one or more colors.

The system and method as described herein may take into consideration the events initiated by real or virtual keyboards of lighting, as well as certain internal events, such as an astronomic clock or simulator of home presence. For example, the events may also be initiated by third-party materials where the protocol used is Artnet (DMX over the Ethernet).

The system and method may provide a feedback to the real or virtual lighting keyboards. The feedback may also be provided to other equipment such as wall touch panels, wireless touch panels.

The gateway 100 may store the events and in a specific events data source, such as a database, that may be access externally.

For example, different components of the gateway may be coded using any efficient programming language (e.g. low-level languages such as C++, and/or GO-language). The use of different languages may reduce the processing time of the request.

The DMX runtime 108 may use any LED drivers to generate the signal on the LED DMX channels. As an example, the drivers may be ColorBeam NorthAmerica™ for RGB. Understandably, even if DMX protocol is preferably used, any other drivers may be used for stripes or lights of different voltages.

Even if the preferred embodiment use the DMX protocol, one skilled in the art shall understand that another protocol may be used. In such a case, the DMX runtime 108 must be replaced with a runtime manager supporting the used protocol and to generate a protocol-compatible signal over the LED lights channels.

In yet another embodiment, the gateway 100 may be configured to process requests (events). Upon reception of the requests and based on the configuration stored in the data source 104, the control manager 102 generates reception or transmission of the UDP packets. As example, the UDP packet may be of the type ARTNET, in order to control the DMX channels and to control the lights fixtures 600 (see FIG. 1).

In at least one embodiment, the control manager 102 analyzes the requests in real time and generates feedbacks to the third-party systems 300. The processing may be a comparison of the request with the conditions stored in the database 104.

In at least one embodiment, a backup service may be used in order to save the configuration. The back-up service may be an online back-up service.

In at least one embodiment, a license service may be used to manage the conformity and the payment of the gateways installed.

Figure 3:
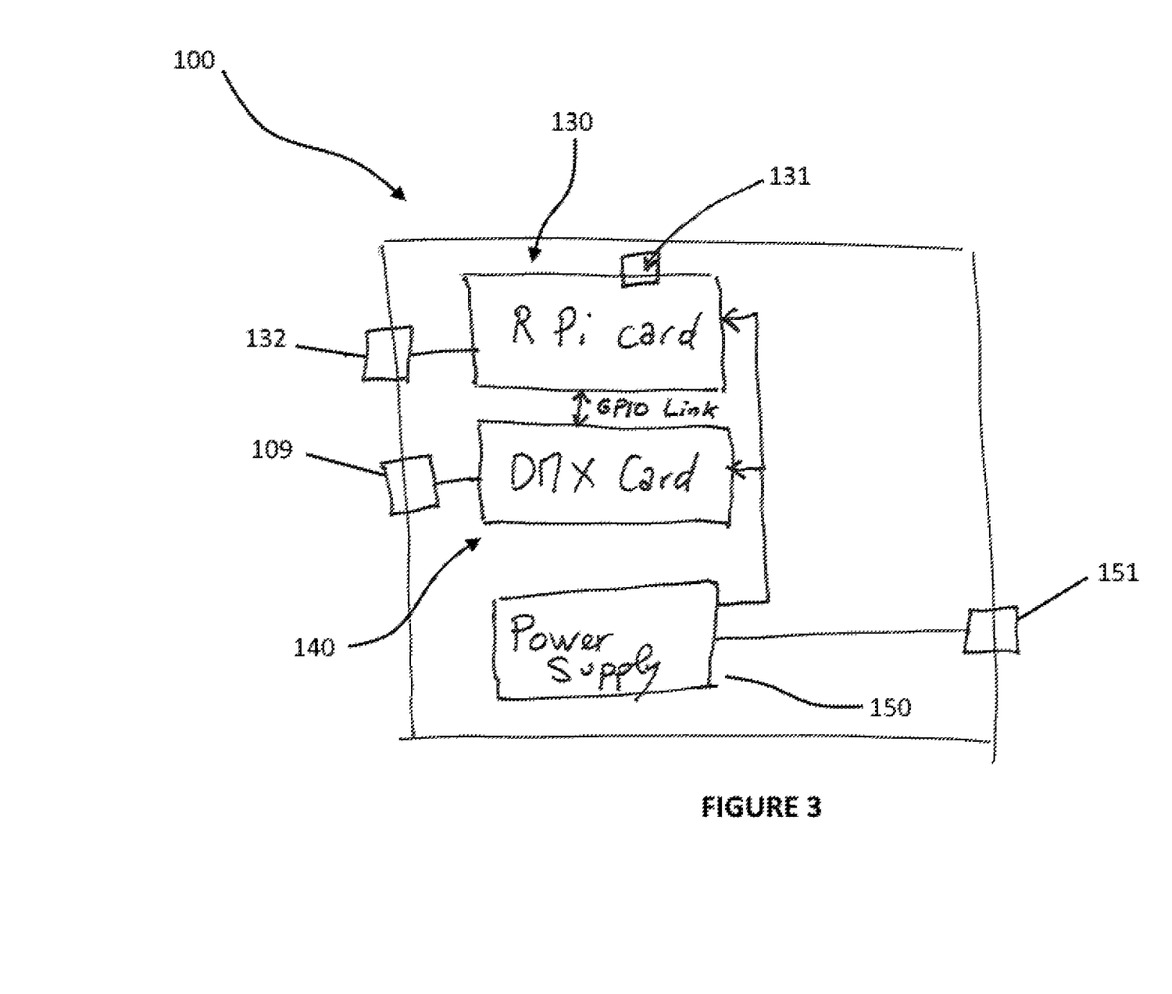
FIG. 3 is an electrical diagram of the lighting gateway system of FIG. 2.

Referring now to FIG. 3, an embodiment of exemplary hardware configuration of the gateway 100 is shown. The gateway 100 typically comprises a processing unit 130 and a DMX interface 140. The processing unit 130 is generally embodied as a computerized device comprising a CPU, different I/O ports, a volatile memory unit, a network adapter 132 and a storage unit. In the preferred embodiment, the storage unit 130 is embodied as a flash memory unit 131, such as a flash reader and a flash card. The program of the gateway is generally stored and executed on the flash memory unit 131.

The DMX interface 140 is typically embodied as DMX card comprising a DMX port 109. The gateway 100 may further comprise a power supply unit 150 comprising a electrical interface 151, such as a 120V input port.

Referring back to FIG. 2, in at least one embodiment the gateway 100 may receive and process the input received from the touch panels and virtual keyboards of type Lutron or real keyboards using a keyboard ID.

In at least one embodiment, the values in the database 104 may be compared to the real-time values. Following an event or request or a change in the value in the DMX active signal, the gateway 100 may compute the conditions of activation and/or deactivation of the feedback (LED on the keypads).

The system 10 may also manage the resulting conditions (e.g. internal logic) set by the installer and start new events to send to the manager of the event.

The event or control manager 102 may further be configured to collect data from a keyboard, read the data source 102, determine the actions to perform and the DMX channels to modify, manage the timing of transmissions (e.g. luminosity and/or color), generate the UDP packet, send the data to enttec module in the Ethernet, add the clock (astronomical) and simulate the presence.

In some embodiment, the database 104 may be extracted and communicated to the computerized device 200 in order to remove load from the gateway 100. Upon executing the required actions (sorting, adding, deleting, editing, etc), the content of the database 104 is communicate and stored to the gateway 100.

Indeed, in typical environment, the database 104 contains a reduced data. As an example, the database 104 may contain as low as 20 tables for which the biggest tables contains a maximum of 1000 records.

Still in such embodiment, as the database 104 is loaded on the client computer 200, the actions are executed by the computerized device 200 and/or by the web browser itself 214. The changes to the database 104 may be communicated to the gateway 100 or to the database 104 through small request to reduce processing of the gateway 100.

All the requests are then transferred to the UDP commands manager 206 which may communicate then with the communication manager 102. The communication manager 102 may then process the requests (e.g. push of the button, start of the lighting scene, direct access to a circuit, modification of a color, etc.).

The external systems 300 may communicate directly with the communication manager 102 and transmit to them requests in the format and at the speed adapted to the communication manager 102.

The communication manager 102 may access the internal databases (e.g. volatile memory storage), process the request, defines whether the feedback is present (e.g. LED on the lighting keyboard, all lights of scene or group reached a predetermined level or at least one light of a scene is turned on, etc.). The communication manager 102 may then transmit the feedback to the UDP command manager 106 which may then transform the data into compatible format for the $3^{rd}$ party control systems 300. The Colorbeam™ or compatible computerized device 200 may receive feedback directly through the WEB socket 212.

The communication manager 102 may also define the modifications to the lighting to be done, which DMX channels to modify as well as time transitions.

The communication manager 102 may then communicate with the DMX Runtime 108 by sending short and simple request. The DMX Runtime 108 then interprets the said short and simple requests and starts and controls one or a plurality of timers. Each of the timers may then take care of one DMX channel. The DMX Runtime 108 may then generate a full DMX frame. In at least one embodiment, the DMX Runtime 108 may transmit as signal on the channel at a frequency of 40 times per seconds. The DMX interface 109 in its turn varies electric levels to control the lighting. The DMX interface 109 may then send at a predetermined frequency generated by the DMX runtime 108, such as 40 times per second which then affect filtering by the LED drivers (outside of the gateway 100) lights up the lights (light fixtures).

The gateway 100 may maintain the communication with the computerized device 200 (e.g. such as a heartbeat) to inquire possible updates or transition to the maintenance mode.

As an example, the communication between the ColoreamNA™ and/or a compatible computerized device 200 and the gateway 100 may be maintained using a secure SSH tunnel which sets a virtual network during the communication.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for controlling a plurality of lighting fixtures in real-time comprising:
   at least one gateway connected to a network, each gateway comprising:
      a data source configured to receive and store lighting programs;
      a control manager in communication with the data source, the control manager being configured to:
         generate one or more request comprising instructions to control to at least one of the lighting fixtures;
         fetch lighting programs for the data source;
      a digital multiplexing (DMX) engine in communication with the control manager, the DMX engine being configured to:
         process the one or more requests of the control manager;
         generate in real time the required signals on at least one DMX channel for control of at least one of the plurality of lighting fixtures, the generated signals being calculated to control the lighting fixtures based on the instructions of the processed request;
      a computerized device, connected to the network and configured to communicate with the gateway to update the lighting programs.

2. The system of claim 1, the system further comprising at least one external control system, the external control system being configured to:
   communicate with the at least one gateway;
   send a request to the control manger comprising instructions for at least one of the plurality of lighting fixtures.

3. The system of claim 2, the at least one instructions being at least one of color, intensity of light, and duration.

4. The system of claim 2, the control manager being further configured to compare the instructions received from the external system with the lighting program stored in the data source and to send a request comprising the instructions of the external system when the instructions of the external system differs from the lighting program data.

5. The system of claim 2, the gateway further comprising a UDP control manager interface configured to send and received UDP request to the external system.

6. The system of claim 1, the at least one of the plurality of lighting fixtures being a light emitting diode (LED).

7. The system of claim 1, the instructions of the request being at least one of color, intensity of light, and duration.

8. The system of claim 1, the gateway further comprising a transient memory unit, the control manager being further configured to load the lighting program data stored in the data source in the transient memory unit.

9. The system of claim 1, the gateway further comprising a websocket interface in communication with the control manager and configured to receive requests from the computerized device, the computerized device further comprising a websocket client interface.

10. A gateway for controlling lighting fixtures, the gateway comprising:
　a data source configured to receive and store lighting programs for lighting fixtures;
　a control manager configured to synchronize with the data source and to generate a request comprising instructions for lighting fixtures;
　a digital multiplexing (DMX) engine in communication with the control manager, the DMX engine being configured to:
　　process the one or more requests of the control manager;
　　generate in real time the required signals on at least one DMX channel for control of at least one of the plurality of lighting fixtures, the generated signals being calculated to control the lighting fixtures based on the instructions of the processed request.

11. The gateway of claim 10, the DMX engine being configured to adjust RGB colors of DMX channels upon reception of the request from the control manager.

12. The gateway of claim 10, wherein the request comprises at least one of the parameters selected in color to be displayed, intensity of light and duration.

13. The gateway of claim 10, the DMX engine further comprising at least one timer, each timer being configured to control frequency of output of the DMX signals over DMX channels.

14. The gateway of claim 10, wherein the frequency at which the request is sent to the DMX runtime from the control manager is lower than the frequency of the signal output to the DMX channels by the DMX runtime.

15. The gateway of claim 10, wherein the frequency at which the request is sent to the DMX runtime from the control manager is at least 10 times lower than the frequency of the signal output to the DMX channels by the DMX runtime.

16. A method for controlling at least one lighting fixture in real time, the method comprising:
　fetching at the parameters of at least one lighting program from a data source;
　generating a request to a DMX engine, the request comprising at least the parameters of the lighting fixture based on the fetched parameters;
　outputting in real time to the at least one DMX channel of the lighting fixture DMX signals required for the lighting fixture to display the parameters of the request;
　receiving a request comprising instructions for a lighting fixture from an external device system;
　comparing the instructions of the received request with the lighting program in the data source;
　communicating a feedback comprising status of the lighting fixture to the external device system;
　generating, in real-time, a new request to the DMX engine when the instructions of the received request differ from the lighting program in the data source.

17. The method of claim 16, wherein the at least one parameter is at least one of color, intensity, and duration.

18. The method of claim 16, wherein the method further comprises generating, in real-time, a new request to the DMX engine when the lighting program is updated in the data source.

19. The method of claim 16, the method further comprising:
　updating a lighting program stored in the data source using a computerized device;
　creating a lighting program and storing the lighting program in the data source using the computerized device.

* * * * *